United States Patent
Bruyere et al.

(10) Patent No.: US 6,339,489 B1
(45) Date of Patent: Jan. 15, 2002

(54) DEVICE FOR COMPENSATING THE DISPERSION OF POLARIZATION IN AN OPTICAL TRANSMISSION SYSTEM

(75) Inventors: Franck Bruyere, Paris (FR); Christian Francia, Reggio Emilia (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/125,316
(22) PCT Filed: Dec. 30, 1997
(86) PCT No.: PCT/FR97/02457
§ 371 Date: Aug. 17, 1998
§ 102(e) Date: Aug. 17, 1998
(87) PCT Pub. No.: WO98/29972
PCT Pub. Date: Jul. 9, 1998

(30) Foreign Application Priority Data

Dec. 30, 1996 (FR) .......................................... 96 16194

(51) Int. Cl.⁷ .............................................. H04B 10/00
(52) U.S. Cl. ..................................... 359/156; 359/187
(58) Field of Search .................................. 359/122, 156, 359/161, 187; 385/11

(56) References Cited

U.S. PATENT DOCUMENTS 5,473,457 A   12/1995  Ono
5,930,414 A  * 7/1999  Fishman et al. ............... 385/11

FOREIGN PATENT DOCUMENTS

EP         0 716 516 A1    6/1996
WO         WO 95/34141    12/1995

OTHER PUBLICATIONS

Patent Abstracts of Japan, vol. 095, No. 011, Dec. 26, 1995 corresponding to JP 07 231297 A (Tohisba Corp) Aug. 29, 1995.

* cited by examiner

Primary Examiner—Jason Chan
Assistant Examiner—Christina Y. Leung
(74) Attorney, Agent, or Firm—Sughrue Mion, PLLC

(57) ABSTRACT

The apparatus comprises a polarization controller (FPC1) and a generator (DDG1) for generating a differential delay between two orthogonal polarization modes. The controller and the generator are interposed between the link fiber (LF) and the receiver terminal (RX). A servo-control unit (SCU1) measures the degree of polarization (PL) of the optical signal delivered by the differential delay generator, and it servo-controls the polarization controller (FPC1) in such a manner as to maximize the degree of polarization (PL). Application to long-haul optical transmission systems.

3 Claims, 3 Drawing Sheets

DEVICE FOR COMPENSATING THE DISPERSION OF POLARIZATION IN AN OPTICAL TRANSMISSION SYSTEM

The present invention relates to apparatus for dynamically compensating, at least in part, polarization dispersion in an optical fiber transmission system. A long-haul optical fiber transmission system comprises:

- a transmitter terminal essentially constituted by a laser diode transmitting a completely polarized optical signal;
- a monomode optical fiber conveying the signal transmitted by the transmitter terminal; and
- a receiver terminal receiving the optical signal conveyed by the fiber.

All types of fiber suffer from polarization dispersion: a pulse transmitted by the transmitter terminal is received distorted. Its duration is greater than its original duration. Such distortion is due to the fact that the optical signal becomes depolarized while it is being conveyed: the signal received at the end of the link fiber may be considered to be constituted by two orthogonal components, one of which corresponds to a polarization state for which the propagation speed is at its maximum (fast main polarization state), the other component corresponding to a polarization state for which the propagation speed is at its minimum (slow main polarization state). In other words, a pulse signal received at the end of the link fiber can be considered to be made up of a first pulse signal polarized in a privileged polarization state, and arriving first, and of a second pulse signal propagating in a delayed propagation state, and arriving with a delay referred to as the "instantaneous differential delay" which depends in particular on the length of the link fiber.

If the transmitter transmits an optical signal made up of a very short pulse, the optical signal received by the receiver terminal is made up of two successive pulses that are polarized orthogonally and that have a time offset equal to the instantaneous differential delay. This delay may be about 20 picoseconds for a link that is 100 kilometers long and that is made using monomode fiber of the kind manufactured a few years ago. The distortion of the pulses received by the receiver terminal can cause errors in decoding the transmitted data. Therefore polarization dispersion constitutes a limiting factor on the performance of optical links, both analog links and digital links.

It is now known how to manufacture monomode fibers having low polarization dispersion (about 0.05 picosecond/√km). However, a large fraction of monomode fibers that have been installed over the last ten years have very high polarization dispersion, and that constitutes a major technical obstacle to increasing transmitted data rates. In addition, the same problem may well arise again even with low polarization dispersion fibers, assuming the race for ever higher data rates continues.

It is known how to make high polarization dispersion fibers that make it possible, by using short segments, to procure a fixed differential delay. Such fibers are also referred to as "polarization-maintaining fibers". By appropriately disposing such a component (or any apparatus for generating a differential delay between two orthogonal polarization modes) in series with a transmission link having high polarization dispersion, it is possible to compensate the polarization dispersion optically. That may be achieved either by using a polarization-maintaining fiber having the same differential delay as the link, but with the slow main polarization state and the fast main polarization state being swapped over, or by causing a main polarization state of the assembly constituted by the link and the polarization-maintaining fiber to coincide with the polarization state of the transmission source. To that end, a polarization controller is used that is placed between the link and the polarization-maintaining fiber.

The value of the differential delay and the main polarization states of a link vary over time as a function of many factors, such as vibration and temperature. Compensation apparatus must therefore be adaptive, and the differential delay of the polarization-maintaining fiber must be chosen to be not less than any of the differential delay values that are to be compensated.

U.S. Pat. No. 5,473,457 describes a method and apparatus for compensating polarization dispersion in an optical transmission system. That apparatus comprises:

- a polarization controller and a segment of polarization-maintaining fiber interposed between the link fiber and the receiver terminal, in that order;
- servo-control apparatus controlling the polarization controller as a function of an error signal;
- means for modulating the frequency of the laser constituting the source of the transmitter terminal; and
- apparatus for measuring the intensity modulation of the received signal, which apparatus comprises a polarizer splitting the signal delivered by the polarization-maintaining fiber into two orthogonally-polarized signals, the axis of the polarizer being disposed at an angle of 45° relative to the intrinsic axes of the polarization-maintaining fiber.

The polarization controller makes it possible to steer the polarization of each of the components of the optical signal delivered by the link fiber, the polarization being steered by turning it through a given angle defined by the value of a command signal applied to the servo-control apparatus. The servo-control means implemented to compensate the polarization dispersion serve to align the slow main state of the link to be compensated with the fast main state of a polarization-maintaining fiber and to align the fast main state of the link to be compensated with the slow main state of said polarization-maintaining fiber which is selected so that its differential delay coincides with the mean polarization dispersion of the link to be compensated. The frequency modulation of the optical signal is converted into polarization modulation by the polarization dispersion of the assembly constituted by the link fiber and by the polarization-maintaining fiber, and then into intensity modulation by the polarizer situated in the apparatus for measuring the intensity modulation of the received signal. The depth of the intensity modulation is directly proportional to the instantaneous differential delay generated by the polarization dispersion, and as weighted by the impact of the polarization of the transmission source (effective differential delay). The intensity modulation signal is used as an error signal to control the polarization controller which is inserted between the link fiber and the polarization-maintaining fiber, the polarization controller being controlled in such a manner as to minimize the intensity modulation signal, and thus to minimize the effective differential delay produced by the assembly comprising the link and the polarization-maintaining fiber. Ideally, the polarization dispersion of the link fiber is exactly compensated by the polarization dispersion, of opposite sign, created by the polarization-maintaining fiber.

That known apparatus suffers from the following drawbacks:

not only does it require the transmitter terminal to be modified to modulate the frequency of the optical signal, but it also requires the receiver terminal to be modified in order to compensate the polarization dispersion; and it needs to be optimized specifically for each link to be compensated even when the link does not have different polarization dispersion.

An object of the invention is to provide optical apparatus that is situated entirely at the receiver terminal so that no modification needs to be made to the transmitter terminal, and that does not need to be optimized specifically for each link.

The invention provides apparatus for compensating polarization dispersion in an optical transmission system comprising a transmitter terminal for transmitting a polarized optical signal, a link optical fiber, optional optical amplifiers, and a receiver terminal, the apparatus comprising:

a first polarization controller;

means for generating a differential delay between two orthogonal polarization modes, said controller and said means being interposed between the link fiber and the receiver terminal, in that order; and servo-control means for servo-controlling the first polarization controller;

said apparatus being characterized in that the servo-control means comprise means for steering the vector of the main polarization state of the assembly constituted by the fiber, the first polarization controller and the means for generating a differential delay, in particular so as to cause said vector to coincide with the vector of the polarization state of the signal at the output of the transmitter terminal.

The apparatus characterized in this way does not need any modification to be made at the transmitter end, and it enables polarization dispersion to be compensated completely provided that the differential delay produced by the compensator is not less than the differential delay existing in the link that is to be compensated. This apparatus thus offers the advantage of not needing to be optimized specifically for each link to be compensated even when the link does not have different polarization dispersion.

In a particular embodiment, the servo-control means comprise means firstly for measuring the degree of polarization of the optical signal delivered by the means for generating a differential delay, and secondly for controlling the first polarization controller in a manner such that the measured degree of polarization is maximized.

The apparatus characterized in this way makes it possible to servo-control the first polarization controller on two operating points. In particular, the servo-control means characterized in this way constitute means making it possible, at one of the two operation points, to steer the vector of the main polarization state of the assembly (constituted by the fiber, the first polarization controller, and the means for generating a differential delay) to cause said vector to coincide with the vector of the polarization state of the signal at the output from the transmitter terminal.

At both of the operating points, operation is based on the correlation existing between the polarization dispersion to which a signal is subjected while it is being conveyed, and the depolarization of the signal; The depolarization is measured by determining the degree of polarization of the received signal, i.e. the ratio of the power of the component in the main polarization direction of the signal divided by the total power of the signal.

Regardless of which operating point is chosen, measuring the degree of polarization of the received signal does not require any modification to be made to the optical signal transmitted by the transmitter terminal, nor does it require any particular means to be provided at the transmitter terminal. Therefore, the entire apparatus for compensating polarization dispersion may be situated at the receiver terminal, or for particular optimization reasons, anywhere else on the link, independently of the transmitter terminal. In addition, it is possible to dispose a plurality of compensation apparatuses along the transmission line.

The invention will be better understood, and other characteristics will appear on reading the following description of embodiments:

Figure 1:
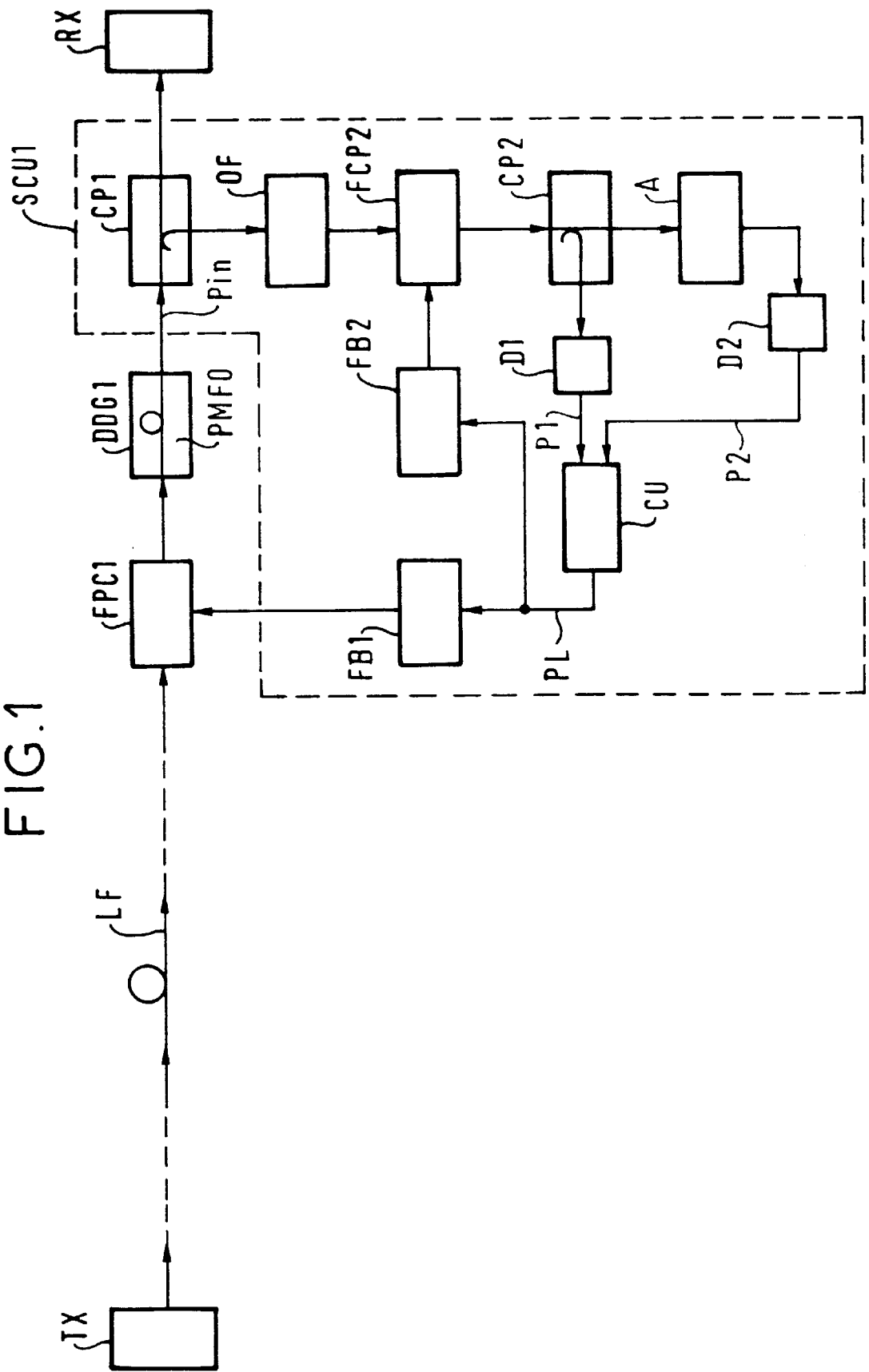
FIG. 1 is a block diagram of an optical transmission system including a first embodiment of apparatus of the invention.

The optical transmission system shown in FIG. 1 comprises:

a conventional transmitter terminal TX for transmitting data, e.g. by modulating in binary manner the intensity of one or more optical carriers, each carrier being a fully-polarized wave delivered by a laser;

a monomode-type "link" fiber LF; a first end of this fiber being connected to an output of the transmitter terminal TX; optical amplifiers optionally being interposed along the fiber to compensate optical losses;

a fiber polarization controller FPC1 having: an output; and an input connected to the second end of the fiber LF, a electrical control input making it possible to turn through a given angle the polarization of every component of the optical signal received by the polarization controller;

a differential delay generator DDG1 for generating a differential delay that has a constant value in the first embodiment;

a servo-control unit SCU1 having: an input connected to the output of the differential delay generator DDG1; a first output which delivers an optical signal, and a second output delivering an electrical control signal to the control input of the polarization controller FPC1; and a conventional receiver terminal RX making it possible to deliver the data conveyed by the optical signal that it receives, the receiver terminal having an input connected to the first output of the servo-control unit SCU1.

In this embodiment, the differential delay generator DDG1 is constituted by a segment PMF0 of polarization-maintaining fiber having a fixed length so as to procure a differential delay between the polarization state for which the propagation speed is at its maximum and the polarization state for which the propagation speed is at its minimum, which differential delay is not less than the maximum differential delay observed when a signal is conveyed by the link fiber LF and by the polarization controller FPC1.

The purpose of servo-controlling the polarization controller FPC1 is to maximize the degree of polarization at the output of the apparatus for compensating polarization dispersion, thereby minimizing the degradation to which the signal is subjected by the polarization dispersion. The servo-control may be performed on two operating points:

1) When the differential delay of the differential delay generator DDG1 is equal to the differential delay of the fiber LF, and if the polarization controller FPC1 is controlled so as to steer the main states of the link fiber so that the slow state coincides with the fast neutral axis of the polarization-maintaining fiber and so that the fast state coincides with the slow neutral axis of the polarization-maintaining fiber, then the differential delay created by the assembly constituted by the fiber LF and by the controller FPC1 is compensated exactly by the differential delay created by the generator DDG1. In practice, the differential delay created by the fiber LF and the polarization controller FPC1 has an instantaneous value that departs to some extent from its mean value, and therefore the compensation is not, in general, total.

2) Another operating point of the apparatus, guaranteeing a maximum degree of polarization and compensation of the polarization dispersion, corresponds to when the polarization controller FPC1 steers the vector of the main polarization state of the link as a whole so as to cause it coincide with the vector of the polarization state of the signal at the output of the transmitter TX, provided that the differential delay generator, e.g. the segment of polarization-maintaining fiber PMF0, procures a differential delay not less than the differential delay observed when a signal is conveyed by the link fiber LF and the polarization controller FPC1. When this condition is satisfied, the vector of the main polarization state of the link as a whole can be steered at will in any direction by means of a polarization controller, and in particular it can be steered into the same direction as the vector of the polarization state of the signal at the output of the transmitter TX. In the event that the differential delay of the polarization-maintaining fiber PMF0 is not sufficient, then polarization dispersion is compensated in part only.

The servo-control unit SCU1 comprises:

an optical coupler CP1 having three accesses, namely a first access constituting the input of the servo-control unit SCU1, a second access constituting the first output of the servo-control unit SCU1, and a third access delivering a fraction of the optical signal delivered by the differential delay generator DDG1;

an optical filter OF interposed on the third access of the coupler CP1 to eliminate out-of-band noise from the wanted signal so as to avoid distorting measurement of the degree of polarization (the filter may also be placed on the link fiber LF when the transmission takes place over a single channel);

a polarization controller FPC2 having an optical input placed at the output of the filter OF, an optical output, and an electrical control input;

a coupler CP2 having three accesses, namely a first access connected to the optical output of the polarization controller FPC2, a second access and a third access delivering respective fractions of the optical signal delivered by the polarization controller FPC2;

a polarizer A placed on the second access of the coupler CP2;

a first photoelectric detector D1 placed on the third access of the coupler CP2 and having an output delivering an electrical signal representative of the intensity of the optical signal delivered by the third access;

a second photoelectric detector D2 placed at the output of the polarizer A, and having an output delivering an electrical signal representative of the intensity of the optical signal received by the second detector;

a calculation unit CU having two inputs connected to respective ones of the outputs of the detectors D1 and D2, and having an output delivering a signal PL representative of the degree of polarization of the optical signal at the output of the differential delay generator DDG1;

a negative feedback circuit FB1 having an input connected to the output of the calculation unit CU, and an output connected to the electrical control input of the polarization controller FPC1; and a negative feedback circuit FB2 having an input connected to the output of the calculation unit CU, and an output connected to the electrical control input of the polarization controller FPC2.

At its third access, the coupler CP1 delivers a constant fraction of the optical signal applied to the input of the servo-control unit SCU1. This fraction is filtered by the filter OF to eliminate noise lying outside the band of the wanted signal, and it is then delivered to the polarization controller FPC2 to match the polarization of this fraction. The signal delivered by the controller FPC2 is then subdivided into two fractions by the coupler CP2, one fraction being applied to the polarizer A, and the other fraction being applied to the photoelectric detector D1.

The photoelectric detectors D1 and D2 make it possible respectively to measure the power $P_{in}$ of the total signal, ignoring an attenuation factor K1, and to measure the power $P_p$ of the signal polarized by the polarizer A, ignoring an attenuation factor K2. The detectors D1 and D2 respectively deliver the following signals:

$P1=K1 \times P_{in}$ $P2=K2 \times P_p$

The attenuation factors K1 and K2 are constant and known. The calculation unit CU calculates the ratio $P_p/P_{in}$, and activates the negative feedback circuits FB1 and FB2 in alternation. The negative feedback circuit FB2 modifies the electrical control signal of the polarization controller FPC2 so as to steer the privileged polarization direction of the signal to match the polarization of the polarizer A. In which case, the value of the ratio $P_p/P_{in}$ is maximized and corresponds to the degree of polarization of the signal, which degree lies in the range 0 to 1.

The negative feedback circuit FB1 modifies the electrical control signal of the polarization controller FPC1 in a direction such that the value PL of the measured degree of polarization is maximized. The polarization dispersion is then at a minimum.

Figure 2:
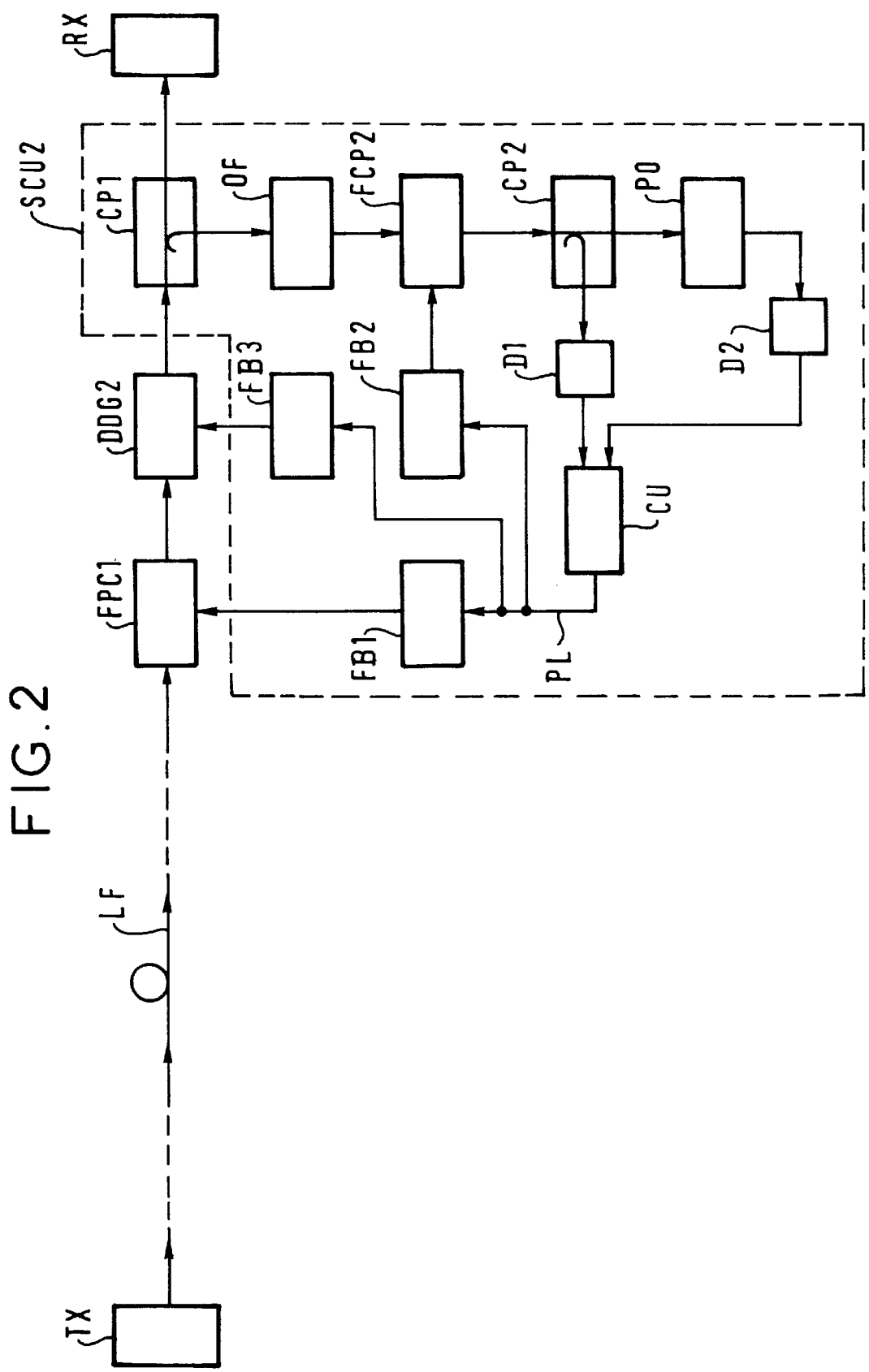
FIG. 2 is a block diagram of an optical transmission system including a second embodiment of apparatus of the invention.

The operating point 2 may be chosen on initializing the apparatus, by ensuring that the FPC1 is servo-controlled in such a manner as to obtain the greatest maximum of the degree of polarization at the output of the assembly constituted by the link, the FPC1 and the compensator. FIG. 2 is a block diagram of a transmission system including a second embodiment of apparatus of the invention. In the second embodiment, the differential delay generator DDG1 for generating a fixed differential delay is replaced with a generator DDG1 for generating an adjustable differential delay, and the servo-control unit SCU1 is replaced with a servo-control unit SCU2 which comprises the same means as the unit SCU1 plus additional means. The means that are analogous to those described above are given the same references and are not described again.

The additional means of the apparatus SCU2 are constituted by a negative feedback circuit FB3 having an output connected to an electrical control input of the differential delay generator DDG2. The negative feedback circuit FB3 is further provided with an input connected to the output of the calculation unit CU to receive the value of the degree of polarization PL. The negative feedback circuit FB3 adjusts the value of the differential delay procured by the generator DDG2 so as to maximize the degree of polarization PL. The servo-control unit SCU2 thus makes it possible to compensate more exactly the differential delay caused by the link fiber LF, in particular if said differential delay caused by the link fiber varies over time. The negative feedback circuits FB1, FB2, FB3 are activated sequentially so as to modify only one setting at a time.

Several embodiments are possible for the adjustable differential delay generator DDG2.

Figure 3:
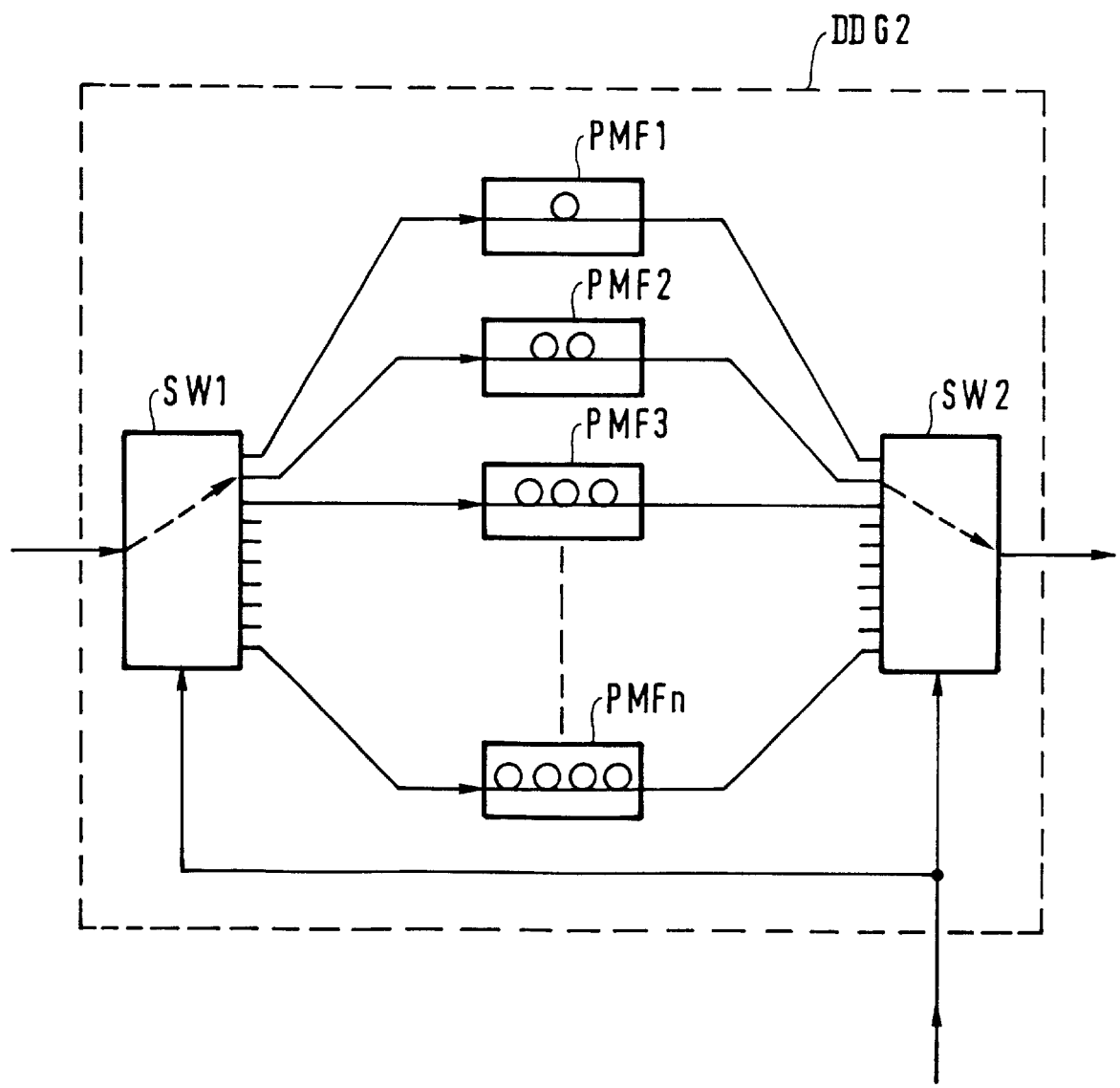
FIG. 3 is a more detailed block diagram of the means used in the second embodiment for generating a differential delay between two orthogonal polarization modes.

FIG. 3 is a block diagram of an embodiment of the generator DDG2. This embodiment comprises:

- a plurality of segments of polarization-maintaining fiber PMF1, PMF2, PMF3, . . . , PMFn which procure respective increasing delays because the segments are of different lengths;
- an optical switch SW1 having an input constituting the input of the generator DDG2, an electrical control input, and n outputs connected respectively to first ends of the n segments of polarization-maintaining fiber PMF1, PMF2, PMF3, . . . PMFn; and
- an optical switch SW2 having an output constituting the output of the generator DDG2, an electrical control input connected in parallel to the control input of the switch SW1, and n inputs connected respectively to second ends of the n segments of polarization-maintaining fiber PMF1, PMF2, PMF3, . . . , PMFn.

Such a variable differential delay generator is simple to make, but it suffers from the drawback of delivering discrete delay values. A differential delay generator is commercially available that procures a delay that is continuously variable up to 250 picoseconds. Such a generator is sold by JDS FITEL located in Nepeam, Ontario, Canada.

In a variant of the first embodiment described with reference to FIG. 1, it is possible to compensate chromatic dispersion, at least in part, in addition to compensating polarization dispersion, by choosing the generator DDG1 to be a polarization-maintaining fiber further having chromatic dispersion opposite to the chromatic dispersion of the link fiber LF.

What is claimed is:

1. Apparatus for compensating polarization dispersion in an optical transmission system comprising a transmitter terminal for transmitting a polarized optical signal, a link optical fiber, and a receiver terminal for receiving the polarized optical signal, the apparatus comprising:

a first polarization controller;

a differential delay generator for generating a differential delay between two orthogonal polarization modes, said first polarization controller and said differential delay generator being interposed in series between the link fiber and the receiver terminal, in that order; and a servo-control unit for servo-controlling the first polarization controller by steering a vector of the main polarization state of the assembly constituted by the fiber, the first polarization controller and the differential delay to coincide with a vector of the polarization state of the signal at the output of the transmitter terminal, said servo-control unit comprising:

an optical coupler for tapping the optical signal output by the differential delay generator;

a second polarization controller for receiving the optical signal from the optical coupler and matching a polarization of the fraction of the optical signal;

a first photoelectric detector for measuring a total intensity of the optical signal output from the second polarization controller;

a second photoelectric detector for measuring the intensity of a component of the optical signal output from the second polarization controller in a fixed polarization direction;

a calculation unit for calculating a degree of polarization of the optical signal on the basis of the intensity of the optical signal in the fixed polarization direction and the total intensity of the optical signal; and a first negative feedback circuit for controlling the first polarization controller as a function of the calculated degree of polarization in a manner such that the degree of polarization is maximized; and a second negative feedback circuit for controlling the second polarization controller in such a manner as to maximize the intensity of the optical signal in the fixed polarization direction.

2. Apparatus according to claim 1, wherein the differential delay generator comprises a segment of polarization-maintaining fiber, procuring a fixed differential delay, between two orthogonal polarization modes, that is not less than the differential delay observed when a signal is conveyed by the link fiber and by the first polarization controller.

3. Apparatus according to claim 1, the differential delay generator generates an adjustable delay, and the apparatus further comprises an additional servo-control unit for controlling the delay in such a manner as to maximize the measured degree of polarization.

* * * * *